United States Patent
Monaka et al.

(10) Patent No.: US 7,459,037 B2
(45) Date of Patent: Dec. 2, 2008

(54) METHOD OF MANUFACTURING REACTOR MEMBER BY USING THE SURFACE TREATMENT METHOD

(75) Inventors: Kazuki Monaka, Hyogo-ken (JP); Juntaro Shimizu, Hyogo-ken (JP); Yoichiro Yamaguchi, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 394 days.

(21) Appl. No.: 11/041,305

(22) Filed: Jan. 25, 2005

(65) Prior Publication Data
US 2005/0220260 A1    Oct. 6, 2005

Related U.S. Application Data

(62) Division of application No. 10/190,517, filed on Jul. 9, 2002, now Pat. No. 6,869,338.

(30) Foreign Application Priority Data
Jan. 7, 2002    (JP) .............................. 2002-000667

(51) Int. Cl.
*C21D 9/02*    (2006.01)
*C21D 7/06*    (2006.01)
*C21D 7/08*    (2006.01)

(52) U.S. Cl. ...................... 148/580; 148/908; 376/900

(58) Field of Classification Search ................ 148/908, 148/580, 537; 376/900, 906
See application file for complete search history.

(56) References Cited

U.S. PATENT DOCUMENTS

| | | | |
|---|---|---|---|
| 3,345,727 A * | 10/1967 | Komarnitsky | ............... 148/580 |
| 4,137,131 A | 1/1979 | Donaghy | |
| 4,672,007 A * | 6/1987 | Teng et al. | ................... 428/624 |
| 5,577,949 A | 11/1996 | Matsumoto | |
| 6,110,823 A | 8/2000 | Eldridge et al. | |
| 6,869,338 B2 * | 3/2005 | Monaka et al. | ............... 451/55 |
| 2003/0129929 A1 | 7/2003 | Monaka et al. | |

FOREIGN PATENT DOCUMENTS

| | | |
|---|---|---|
| EP | 0 523 914 A1 | 1/1993 |
| EP | 1 033 194 A 1 | 9/2000 |
| JP | 4-27892 | 1/1992 |
| JP | 5-142372 | 6/1993 |

* cited by examiner

*Primary Examiner*—Deborah Yee
(74) *Attorney, Agent, or Firm*—Oblon, Spivak, McClelland, Maier & Neustadt, P.C.

(57) ABSTRACT

A method of surface-treating a reactor member for effectively removing a Cr-deficient layer and a work-hardened layer considered to be a cause of stress corrosion cracking (SCC) under low-stress conditions. The method of surface-treating a reactor member which is worked by bending (step 1) and then processed by a heat treatment (step 2), in which a work-hardened layer is formed by the bending, and in which a Cr-deficient layer is formed due to an oxide film attached by the heat treatment, uses at least one of: acid wash; grinding; electrolytic polishing; electro-discharge machining; surface cutting; surface deoxidation and softening; wet blasting; laser machining; or surface plating (step 3) to remove the work-hardened layer and the Cr-deficient layer from the reactor member or to prevent contact of the work-hardened layer and the Cr-deficient layer of the reactor member with a primary coolant.

4 Claims, 6 Drawing Sheets

MANUFACTURING PROCESS OF THE INVENTION

METHOD OF MANUFACTURING REACTOR MEMBER BY USING THE SURFACE TREATMENT METHOD

This application is a divisional of Ser. No. 10/190,517 filed Jul. 9, 2002 which is now U.S. Pat. No. 6,869,338.

BACKGROUND OF THE INVENTION

1. Field of the Invention

The present invention relates to a fuel assembly for use in a pressurized water reactor and, more particularly, to a method of surface-treating a leaf spring provided on an upper nozzle.

2. Description of the Related Art

FIG. 4 is a diagram schematically showing a fuel assembly ordinarily used in pressurized water reactors, and FIGS. 5A and 5B are diagrams schematically showing a leaf spring. Referring to FIG. 4, the fuel assembly 1 is constituted by an upper nozzle 2, a lower nozzle 3, a plurality of grids 4, control rod guide tubes 5, and a multiplicity of fuel rods 6. More specifically, the upper nozzle 2 and the lower nozzle 3 are placed spaced apart from each other in the vertical direction, and a plurality of grids 4 are placed at certain intervals between the upper and lower nozzles 2 and 3. Each grid 4 has grid spaces formed by straps. The control rod guide tubes 5 are inserted in the grid spaces at predetermined positions and are fixed by fixing portions of the grid 4. The upper and lower ends of the control rod guide tubes 5 are connected to the upper and lower nozzles 2 and 3. The multiplicity of fuel rods 6 are elastically supported by supporting portions of the grids 4. The fuel assembly 1 is held in a core (not shown) by an upper core plate 7 and a lower core plate 8 of an in-reactor structure.

A leaf spring 9 is provided on the upper nozzle 2 by being interposed between the upper nozzle 2 and the upper core plate 7. The leaf spring 9 has the function of absorbing elongation of the fuel assembly 1 caused by irradiation as well as the differences in thermal expansion between the fuel assembly 1 and the in-reactor structure, and also has the function of preventing the fuel assembly 1 from being floated by cooling water flowing in from below.

There are certain types of fuel assembly 1 ordinarily used, e.g., the 17×17 type, the 15×15 type, and the 14×14 type selected according to the number of fuel rods 6 arrayed. FIGS. 5A and 5B illustrate the structure of an example of the 17×17 type of leaf spring 9. The leaf spring 9 is formed of an upper spring 10 and a lower spring 11. The lower spring 11 is formed of two plate members.

FIG. 5B is an enlarged detailed diagram of a portion A surrounded by the dotted line in FIG. 5A. As can be seen in FIGS. 5A and 5B, the upper spring 10 has a curved portion 12 and a vertical portion 13, and the vertical portion 13 has stepped edges 14. The lower spring 11 has a through hole 15. The upper spring 10 and the lower spring 11 are combined in an integrated structure such that the vertical portion 13 of the upper spring 10 is passed through the through hole 15, and the upper spring 10 contacts the lower spring 11 with the stepped edges 14 of the vertical portion 13.

The leaf spring 9 has a base portion 16 formed in a horizontal structure for fixation on the upper nozzle 2. The base portion 16 is parallel to an upper surface of the upper nozzle 2. The leaf spring 9 is fixed on the upper nozzle 2 with the base portion 16 fastened to the upper nozzle 2 by an attachment bolt 17. The leaf spring 9 is formed so that its upper end (in the vicinity of the curved portion 12) is brought into contact with the upper core plate 7 to produce a pressing force. The leaf spring 9 is therefore bent upwardly at a comparatively large angle in the vicinity of the base portion 16. A precipitation-hardened alloy of a high proof stress (e.g., Inconel 718) is used as the material of the leaf spring 9 in order to obtain the necessary spring force.

Ordinarily, the fuel assembly 1 is used in a reactor while being immersed in a primary coolant. In the leaf spring 9, stress is caused during use in the reactor. There is a possibility of stress-corrosion cracking (SCC) caused in the leaf spring 9 by high temperature primary coolant. Also, it is thought that the state of the surface of the leaf spring material in contact with the primary coolant influences stress-corrosion cracking (SCC).

A conventional leaf spring manufacturing process under the above-described circumstances will be briefly described with reference to FIG. 6. Since as mentioned above the base portion 16 of the leaf spring 9 is fixed on the upper nozzle 2, the base portion 16 must be provided in a horizontal structure. On the other hand, the upper end of the leaf spring 9 is shaped so as to be suitable for contact with the upper core plate 7 in producing the necessary pressing force. Accordingly, bending (step 1) is performed to bend the base portion 16 of the leaf spring 9 upward. In this bending process, the leaf spring is bent so as to have a comparatively large angle. Therefore, it is necessary, from the viewpoint of workability, to perform bending before heat treatment (step 2).

However, if bending is performed before the heat treatment, there is a problem that an oxide film formed by the heat treatment attaches to the bent portion to form a Cr-deficient layer. Ordinarily, this oxide film is removed by grinding the surface. However, it is extremely difficult to remove the oxide film by grinding based on ordinary grinding methods since this grinding is performed after bending (step 1). Therefore, the bent portion is presently left in its unground state. Consequently, therefore, in addition to the work-hardened layer remaining after bending, a Cr-deficient layer is formed in the bent portion due to the oxide film. Accordingly, there is a possibility of the leaf spring 9 stress-corrosion cracking resistance characteristics (SCC resistance characteristics) deteriorating due to such layers.

As a method for surface treatment of the leaf spring 9, a method has been used in which the oxide film is removed by glass bead blasting (GBB) to obtain an improved appearance of the product after a final machining step (step 3) following the heat treatment (step 2). However, it is difficult to remove the Cr-deficient layer in the metallic portion by this GBB. Stronger GBB entails the risk of newly forming a work-hardened layer and is therefore undesirable.

The points in the above are potential factors to be a cause of stress-corrosion cracking (SCC) under a low-stress condition. That is, the Cr-deficient layer reduces the corrosion resistance of the surface, while the surface work-hardened layer increases the possibility of early cracking.

SUMMARY OF THE INVENTION

In view of the above-described problems of the conventional art, an object of the present invention is to provide a method of surface-treating a reactor member so that the Cr-deficient layer and the work-hardened layer formed as surface layers are effectively removed.

In order to attain the above-mentioned object, according to a first aspect of the present invention, in a method of performing a surface treatment on a reactor member which is worked by bending and then processed by a heat treatment, in which a work-hardened layer is formed by the bending, and in which a Cr-deficient layer is formed due to an oxide film attached by the heat treatment, the method is characterized by using at least one of: acid wash; grinding; electrolytic polishing; electro-discharge machining; surface cutting; surface deoxidation and softening; wet blasting; and laser machining to remove the work-hardened layer and the Cr-deficient layer from the reactor member.

According to a second aspect of the present invention, in a method of performing a surface treatment on a reactor member which is worked by bending and then processed by a heat treatment, in which a work-hardened layer is formed by the bending, and in which a Cr-deficient layer is formed due to an oxide film attached by the heat treatment, the method is characterized in that surface plating is performed to the reactor member to prevent contact of the work-hardened layer and the Cr-deficient layer of the reactor member with a primary coolant.

It is possible to remove the Cr-deficient layer and the surface work-hardened layer in the surface of the reactor member or to prevent contact of the Cr-deficient layer and the work-hardened layer with the primary coolant by performing a surface treatment based on the surface working method formed as described above.

The surface treatment is performed so that the amount of grinding is preferably in the range from 1 to 100 μm and the surface roughness is in the range of 0.1a to 0.4a. More preferably, the surface treatment is performed so that the amount of grinding is 75 μm and the surface roughness is 0.2a. As the reactor member to which the present invention is applied, a leaf spring placed on an upper nozzle of a fuel assembly for use in a pressurized water reactor is preferable.

According to yet another aspect of the present invention, a method of manufacturing a reactor member is characterized by comprising: (i) a bending step for bending the reactor member through a predetermined angle; (ii) a heat treatment step for heat-treating the bent reactor member; (iii) a surface treatment step for removing a work-hardened layer formed by the bending and a Cr-deficient, layer formed due to an oxide film attached by the heat treatment, or for preventing contact of the work-hardened layer and the Cr-deficient layer of the reactor member with a primary coolant; and (iv) a final finishing step for finishing the reactor member.

It is possible to remove the Cr-deficient layer and the surface work-hardened layer in the member surface or to prevent contact of the Cr-deficient layer and the work-hardened layer with the primary coolant by performing a surface treatment based on the surface working method formed as described above. The reactor member thus finished is resistant to stress-corrosion cracking.

The surface treatment step for removing the Cr-deficient layer formed due to the oxide film attached by the heat treatment is preferably one of: acid wash; grinding; electrolytic polishing; electro-discharge machining; surface cutting; surface deoxidation and softening; wet blasting; and laser machining. Further, the surface treatment step for preventing contact of the work-hardened layer and the Cr-deficient layer of the reactor member with the primary coolant is preferably surface plating.

DETAILED DESCRIPTION OF THE PREFERRED EMBODIMENT

Figure 1:
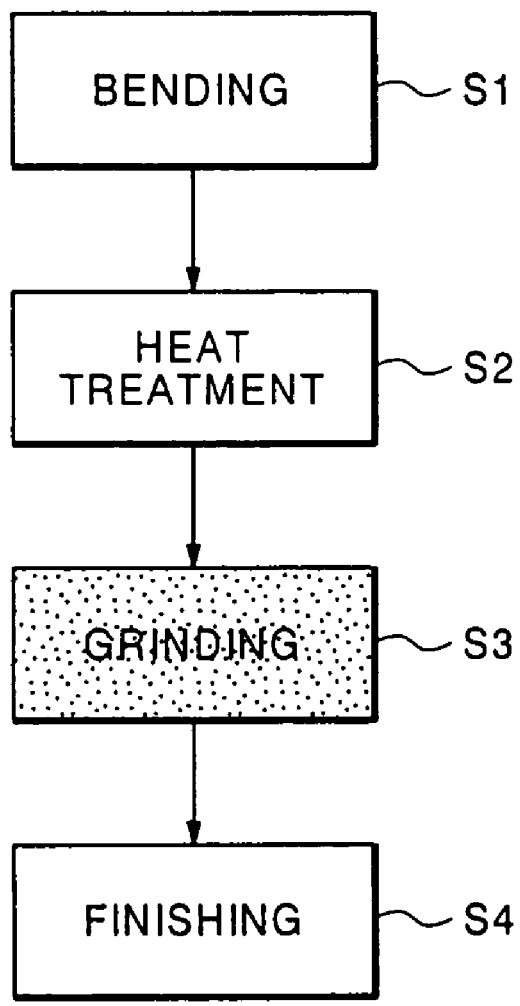
FIG. 1 is a diagram showing a manufacturing process in accordance with the present invention.

A preferred embodiment of the present invention will be described with reference to the accompanying drawings. In the drawings, the same reference characters indicate the same or corresponding components.

As described above, the process under the present circumstances causes a Cr-deficient layer and a work-hardened layer to remain in a bent portion of a worked member. To improve the stress-corrosion cracking resistance characteristics (SCC resistance characteristics) of the worked member, it is necessary to efficiently remove the Cr-deficient layer and the work-hardened layer. Conditions for grinding which are sufficiently effective in removing the Cr-deficient layer and the work-hardened layer without an adverse effect in terms of working cost were devised as grinding conditions in accordance with the present invention, as described below.

[Cr-Deficient Layer]

Figure 2:
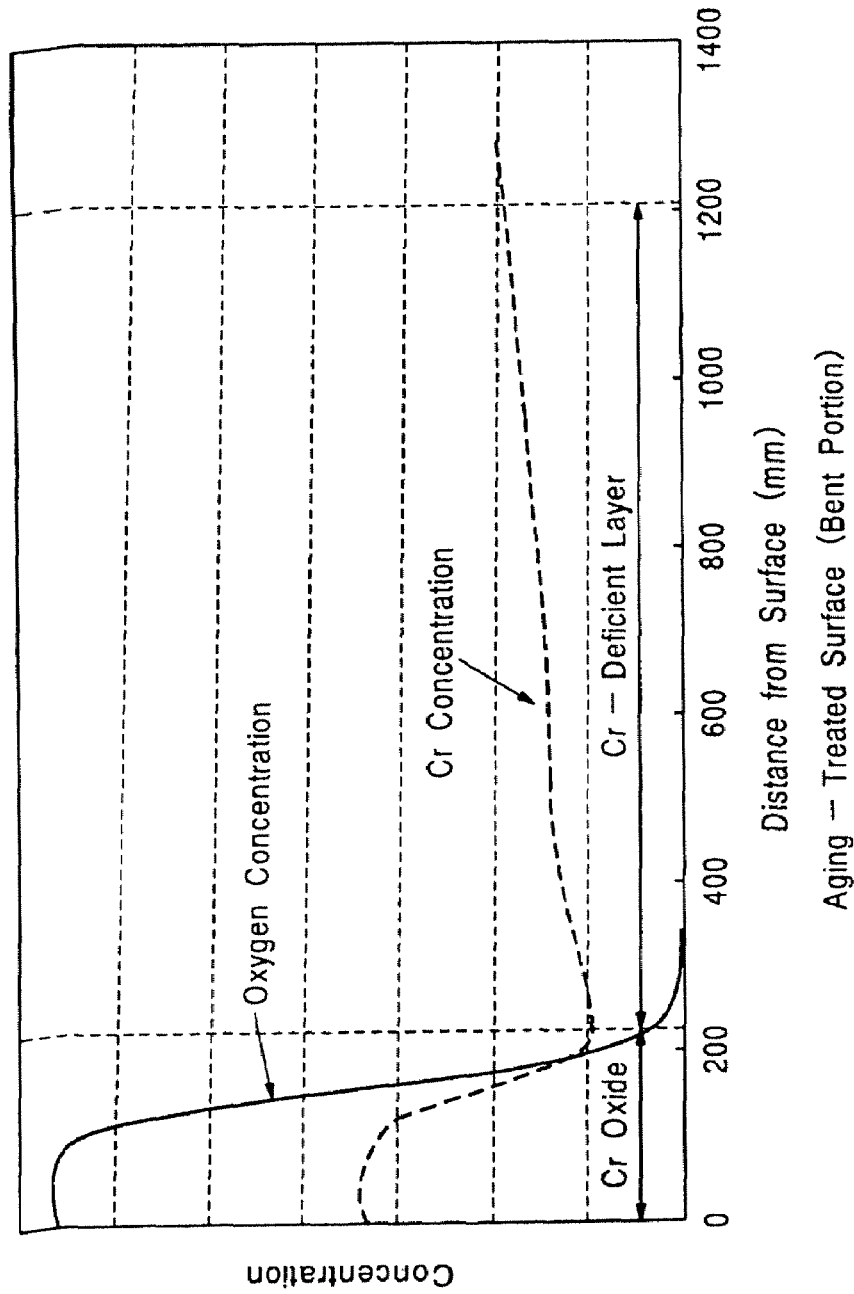
FIG. 2 is a graph showing the results of elemental analysis performed on a leaf spring (bent portion) after aging treatment.

Elemental analysis was first performed on the Cr-deficient layer with respect to the Cr concentration and the oxygen concentration after an aging treatment on the leaf spring. FIG. 2 shows the results of this analysis. Chromium oxide was produced in a 0.2 μm surface region. A state was observed in which both the Cr concentration and the oxygen concentration were high due to this oxide. It can be seen that the Cr concentration decreases abruptly at a position in the oxide region further from the surface, and that, with a further increase in the distance from the surface, the Cr concentration recovers gradually but is lower than that in the basic material. The region where the Cr concentration is low as described above has a depth of about 1 μm from the surface.

[Bending-Work-Hardened Layer]

Figure 3:
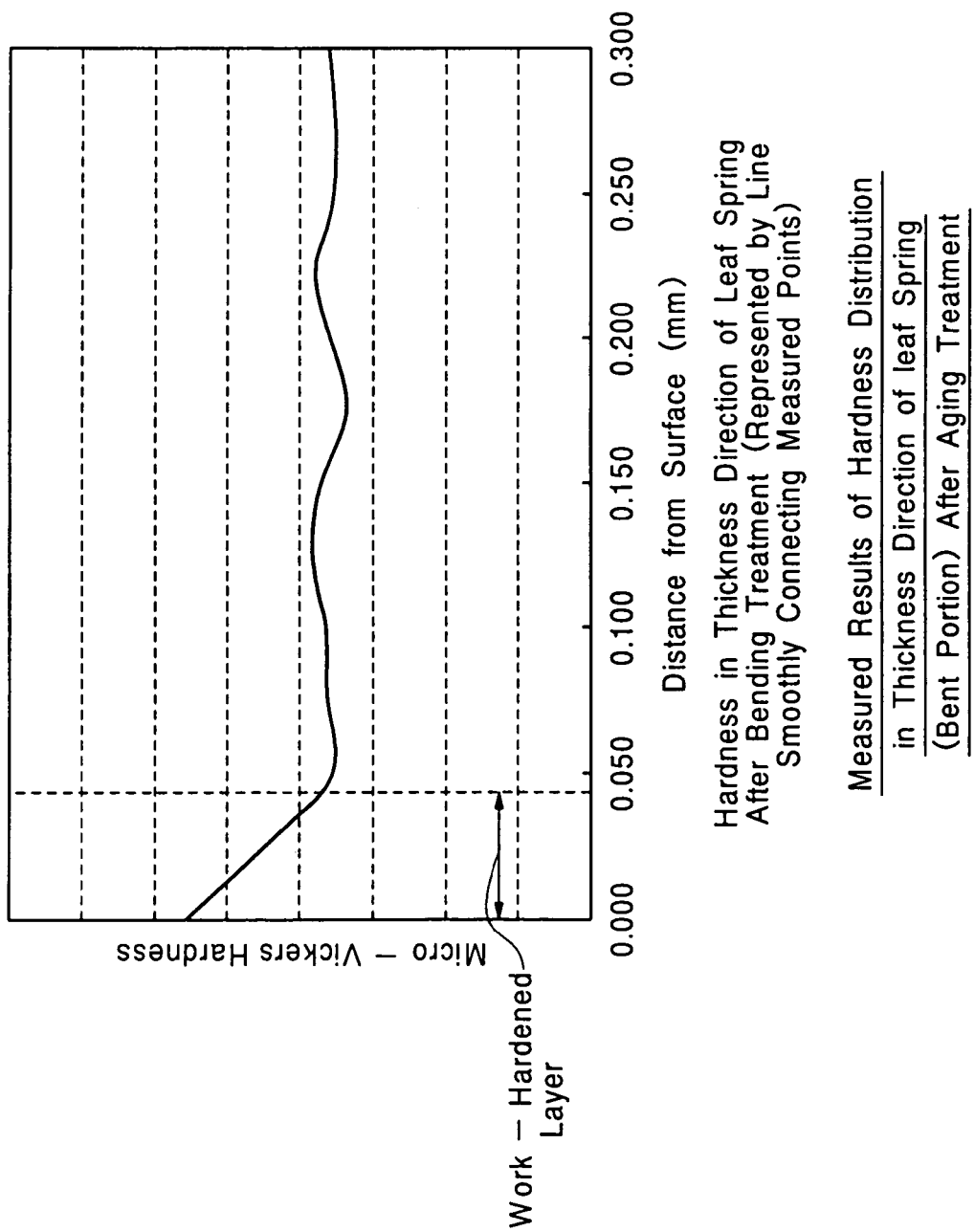
FIG. 3 is a graph showing the result of measurement of measured results of hardness distribution in thickness direction of the leaf spring (bent portion) after aging treatment.
Figure 4:
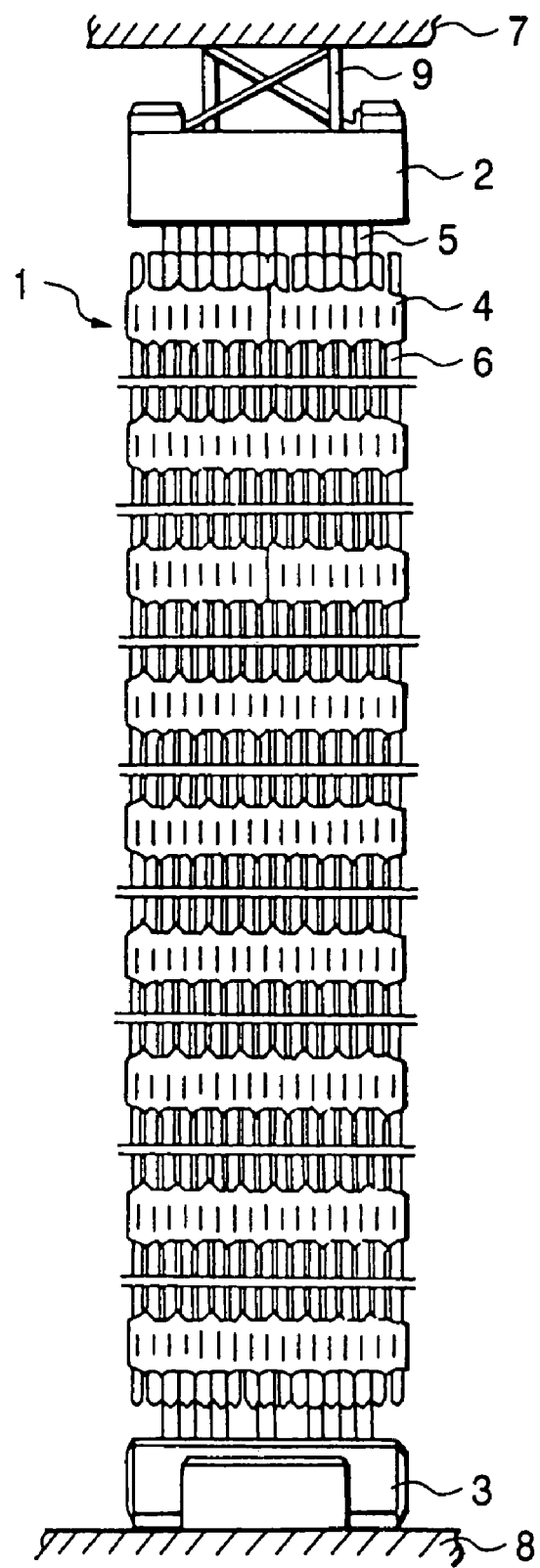
FIG. 4 is a diagram schematically showing a fuel assembly ordinarily used in pressurized water reactors.
Figure 5A:
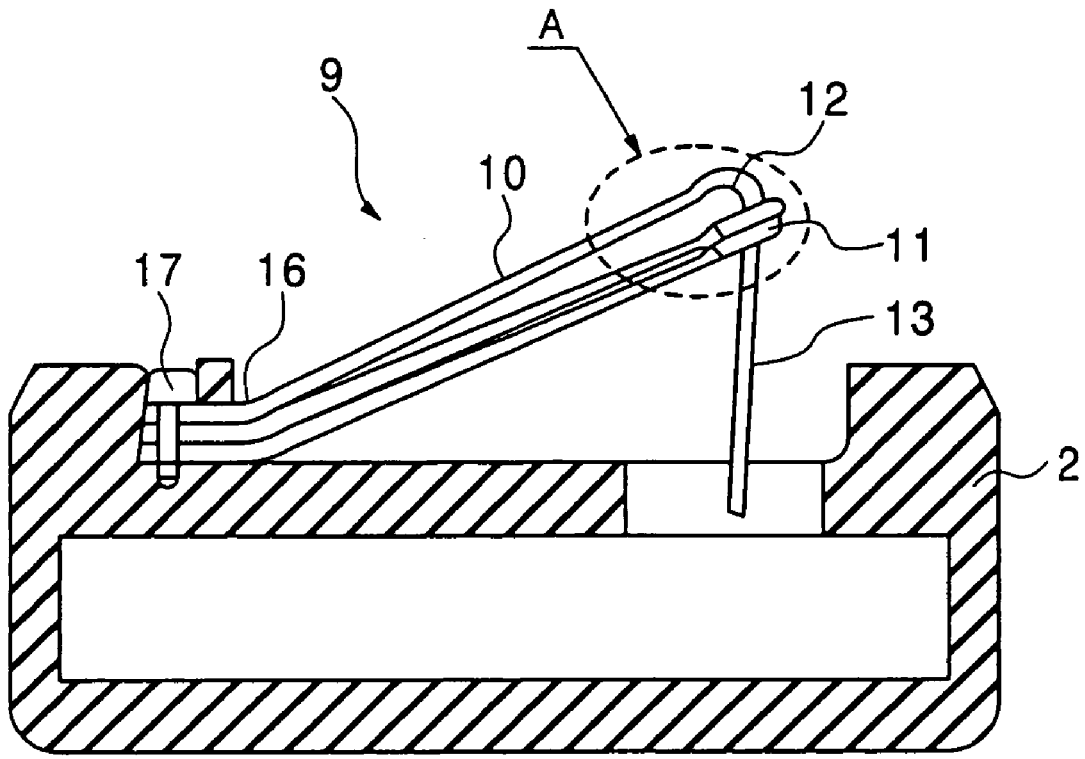
FIGS. 5A and 5B are diagrams schematically showing the leaf spring.
Figure 5B:
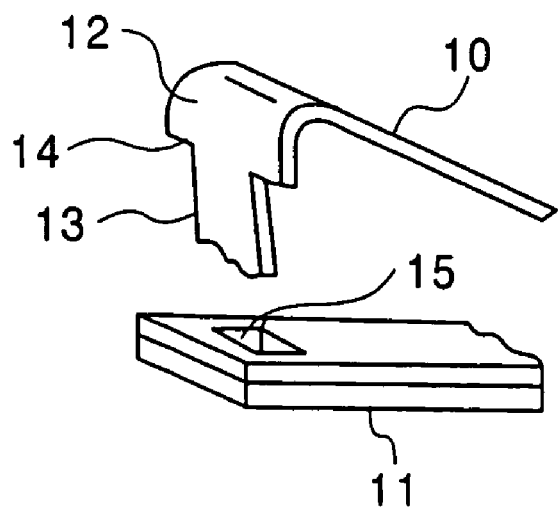

As a test on the bending-work-hardened layer, a micro-Vickers hardness test was made with respect to the thickness direction of the spring cross-section after bending. FIG. 3 shows the results of this test. From these results, it can be understood that the hardness increased in a 50 μm region when the leaf spring was bent.

The results of the two kinds of tests above show that the work-hardened layer is thicker than the Cr-deficient layer. Determination of grinding conditions from this viewpoint may suffice. Accordingly, to reliably grind the work-hardened layer, the amount of grinding may be set to 50 μm. However, there is a possibility of the work-hardened layer having a thickness smaller than 50 μm, depending on the degree of bending. For this reason, grinding is performed by at least an amount of 1 μm to cover the above-described low-Cr-concentration region.

On the other hand, if the amount of grinding is large, the grinding time is considerably increased since the material is heat-treated before grinding to have a high hardness, resulting in an increase in manufacturing cost. Therefore a smaller grinding amount is preferred from the viewpoint of cost. Consequently, it is desirable to limit the amount of grinding to 100 μm or less.

From the above analysis, the optimum values and ranges of the amount of grinding and the surface roughness after grinding are determined as shown below.

|  | (Optimum value) | (Range) |
|---|---|---|
| Amount of grinding | 75 μm | 1 μm-100 μm |
| Surface roughness | 0.2 a | 0.1 a-0.4 a |

The inventors of the present invention have confirmed that leaf springs processed by grinding in the above-described range have improved stress-corrosion cracking resistance characteristics (SCC resistance characteristics) in comparison with those processed by the conventional method.

Figure 6:
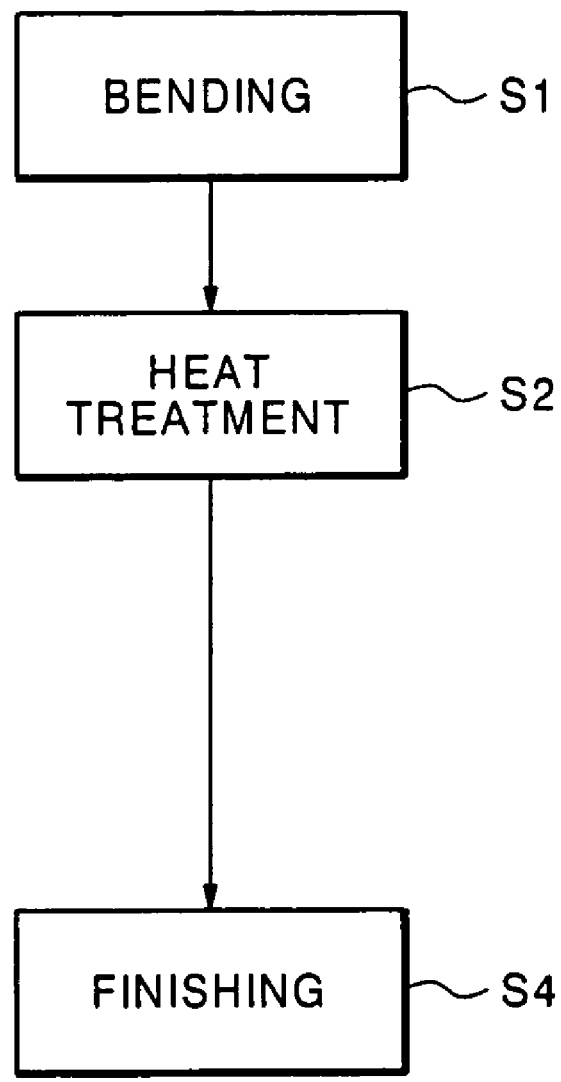
FIG. 6 is a diagram showing a conventional manufacturing process.

According to the present invention, a surface treatment including the above-described grinding is performed before a finishing step to prevent occurrence of stress-corrosion cracking (SCC) in the leaf spring. FIG. 1 shows a leaf spring manufacturing process to which the present invention has been applied. As can be understood from FIG. 1, the difference from the conventional manufacturing process (see FIG. 6) resides in that a surface treatment including a grinding step (step 3) is performed between a heat treatment step (step 2) and a finishing step (step 4). Various surface working methods are listed below, each of which may be carried out with efficiency as a method for surface treatment of the leaf spring after the heat treatment so as to meet the above-described grinding conditions for working of the spring.

[Removal of Cr-Deficient Layer and Surface-Work-Hardened Layer in Leaf Spring Surface]

(1) Acid Wash

The surface film after the aging treatment is removed by using nitric acid or the like. A surface portion of the leaf spring including a highly stressed portion in which stress-corrosion cracking (SCC) can easily occur is removed by being melted. To enable this, the amount of etching is controlled by controlling the acid concentration, processing time, temperature, and other factors.

(2) Grinding

The surface film after the aging treatment is removed by grinding with a mechanical tool or grinding based on manual work. The shape and size after the heat treatment are measured to determine the amount of working on each portion to be worked, and the portion is worked by the determined amount. The shape of the grinding wheel and the tool used to perform grinding are changed with respect to the portions to be worked.

(3) Electrolytic Polishing

The surface film after the aging treatment is removed by electrolytic etching. A direct current is caused to flow through an electrolytic polishing solution selected according to the metal, with the object of processing used as an anode, thereby dissolving the surface of the object.

(4) Electro-Discharge Machining

The surface film after the aging treatment is removed by electro-discharge machining. An electrode is made so as to conform to the shape of the leaf spring. The surface layer existing in the portion facing the electrode is removed by arc discharge.

(5) Surface Cutting

The entire surface of the leaf spring formed from a material in the form of a thick plate is shallowly cut to a predetermined size by wire cutting to remove the surface layer.

(6) Surface Deoxidation and Softening

The leaf spring is heated in a hydrogen atmosphere (reducing atmosphere) at such a low temperature that no heat treatment effect is produced, instead of undergoing the process of mechanically removing the Cr-deficient layer from the surface. Only a thin surface portion is thereby annealed to soften and to increase the ductility thereof to such an extent that the surface-work-hardened layer disappears. Also, the oxides in the leaf spring surface including Cr can be reduced to return Cr to the metallic basic material, thereby eliminating the Cr-deficient layer.

(7) Wet Blasting

The surface layer is removed by performing wet blasting characterized by the combined effect of water+grinding material+air (compressed air) instead of glass bead blasting (GBB), which is dry blasting.

(8) Laser Machining

The surface layer in the region of the leaf spring designated as a portion to be worked is removed by laser irradiation.

[Prevention of Contact of Cr-Deficient Layer and Work-Hardened Layer in Leaf Spring Surface with Primary Coolant]

(9) Surface Plating

The leaf spring is plated to prevent contact of the Cr-deficient layer in the surface with the primary coolant.

A surface treatment process based on one of the above-described nine kinds of surface working methods is performed after the heat treatment to remove the Cr-deficient layer or work-hardened layer in the leaf spring surface, which is considered to be the problem of the conventional art, or to prevent contact of the Cr-deficient layer and the work-hardened layer with the primary coolant. Consequently, occurrence of stress-corrosion cracking (SCC) in the leaf spring can be prevented.

What is claimed is:

1. A method of manufacturing a reactor member comprising:
   first, bending the reactor member so as to have a predetermined angle, then
   second, heat-treating the bent reactor member, then
   third, removing a work-hardened layer formed by said bending and a Cr-deficient layer formed due to an oxide film attached by said heat treatment, thereby preventing contact of the work-hardened layer and the Cr-deficient layer of the reactor member with a primary coolant, and then
   finishing the reactor member;
   wherein the removing is performed so that the amount removed is in the range from 1 to 100 μm and the surface roughness is in the range of 0.1a to 0.4a; and
   the reactor member is a leaf spring placed on an upper nozzle of a fuel assembly for use in a pressurized water reactor.

2. A method according to claim 1, wherein said removing comprises one of: acid wash; grinding; electrolytic polishing; electro-discharge machining; surface cutting; surface deoxidation and softening; wet blasting; and laser machining.

3. A method according to claim 1, wherein said finishing comprises surface plating.

4. A method according to claim 1, wherein the removing is performed so that the amount of grinding is 75 μm and the surface roughness is 0.2a.

* * * * *